United States Patent [19]

Bar-On et al.

[11] 4,103,675

[45] Aug. 1, 1978

[54] SOLAR COLLECTORS

[76] Inventors: Benjamin Bar-On, 15 Hacarmel St., Rishon Lezion; Eldad Paz, 9 Haysur St., Ramat Hasharon, both of Israel

[21] Appl. No.: 763,990

[22] Filed: Jan. 31, 1977

[51] Int. Cl.[2] .............................................. F24J 3/02
[52] U.S. Cl. ............................. 126/271; 29/157.3 R
[58] Field of Search ............... 126/270, 271; 237/1 A; 29/157.3 R

[56] References Cited

U.S. PATENT DOCUMENTS

| | | | |
|---|---|---|---|
| 1,889,238 | 11/1932 | Clark | 126/271 |
| 3,193,919 | 7/1965 | Rouse, Jr. | 29/157.3 |
| 3,239,000 | 3/1966 | Meagher | 126/271 |
| 3,934,323 | 1/1976 | Ford et al. | 126/271 |
| 3,937,208 | 2/1976 | Katz | 126/271 |
| 4,000,850 | 1/1977 | Diggs | 237/1 A |
| 4,022,272 | 5/1977 | Miller | 29/157.3 |

FOREIGN PATENT DOCUMENTS 1,328,372   8/1973   United Kingdom ..................... 126/271

*Primary Examiner*—Kenneth W. Sprague
*Attorney, Agent, or Firm*—Benjamin J. Barish

[57] ABSTRACT

A solar collector using a basic element suitable for modular construction is described, comprising an absorber panel including a plurality of metal extrusions attached together in the direction of the width of the panel, and further metal extrusions each cut along a diagonal line and attached to the opposite ends of the absorber panel to form the inlet and outlet manifolds. The solar collector further includes transparent window panels attached to the housing frame by a mounting having a resilient partition facing the absorber panel to partition the space between the transparent panel and the absorber panel and thereby to reduce convection losses.

9 Claims, 9 Drawing Figures

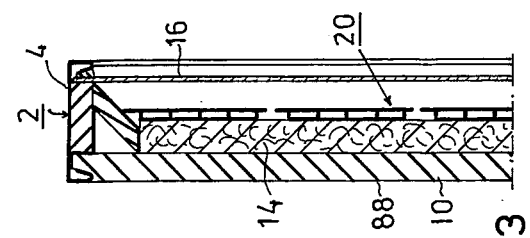
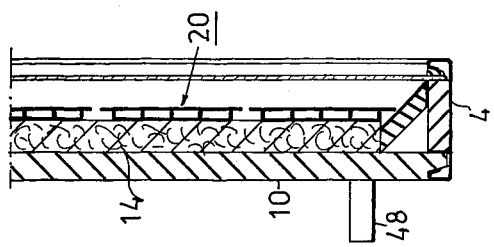
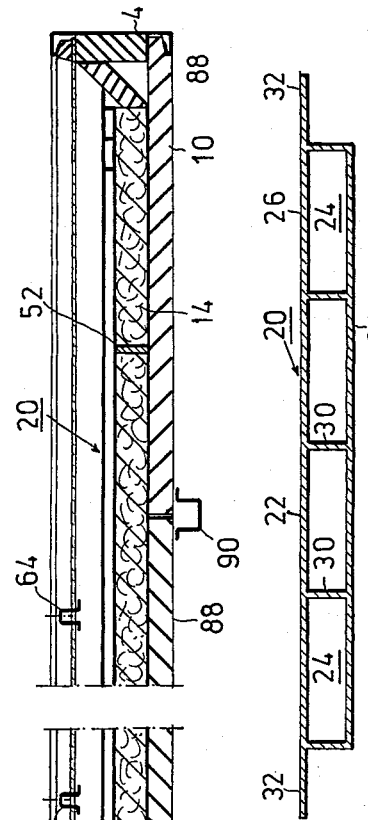
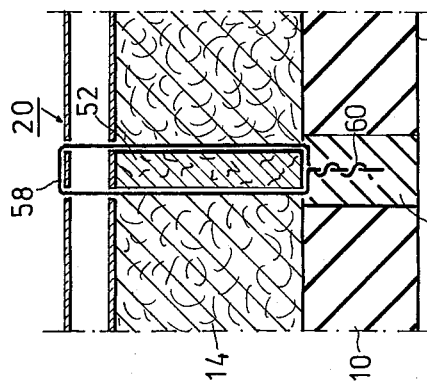
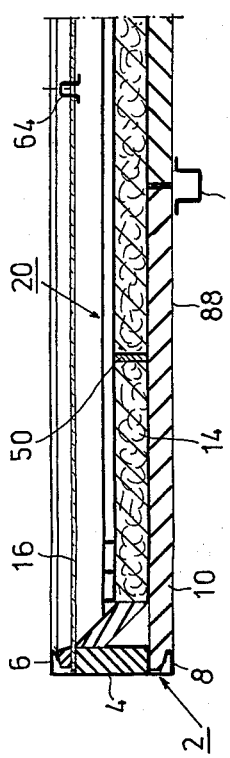
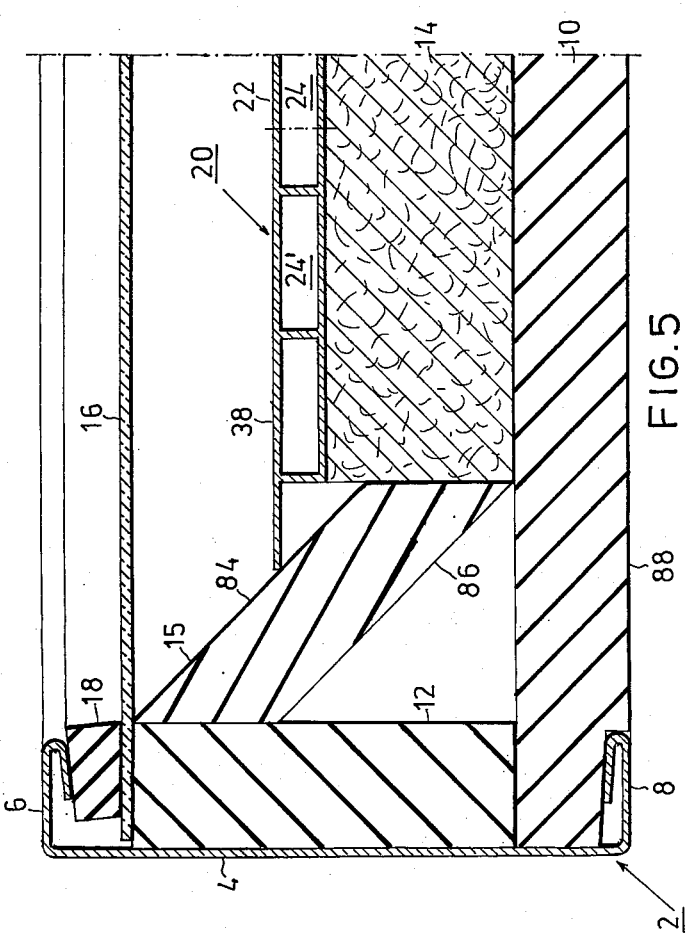

SOLAR COLLECTORS

BACKGROUND OF THE INVENTION

The present invention relates to solar collectors such as are used for utilizing solar energy to heat a fluid, for example water.

Many types of solar collectors are now in use. They generally include a housing having an absorber panel containing fluid-conducting channels for conducting the fluid to be heated by the solar radiations intercepted by the absorber panel. Generally, however, the known types of solar collectors are expensive to produce, have relatively low collector efficiency, and/or do not readily lend themselves to modular construction to enable the same basic elements to be used for producing different size collectors for any particular application.

An object of the present invention is to provide an improved solar collector having advantages in the above respects.

BRIEF SUMMARY OF THE INVENTION

According to the present invention, there is provided a solar collector comprising a housing having a window transparent to solar radiations, and an absorber panel disposed within the housing and having a solar-radiation-absorbing surface facing the window. The absorber panel includes a main extrusion section integrally formed with a plurality of fluid-conducting channels extending in one direction through the panel for conducting a fluid to be heated by the solar radiations. The panel further includes two end extrusions each integrally formed with a plurality of fluid-conducting channels extending at right angles to those of the main extrusion section and each cut along a diagonal line through its respective plurality of channels. One end extrusion is joined along its diagonal cut line to one end of the main extrusion section and constitutes the inlet manifold of the absorber panel, and the other end extrusion is joined along its diagonal cut line to the opposite end of the main extrusion section and constitutes the outlet manifold of the absorber panel.

In the preferred embodiment of the invention described below, the main extrusion section and the end extrusions are of metal and each includes outer walls joined together by a plurality of transverse partitions defining the fluid-conducting channels therebetween. In addition, the two ends of the main extrusion section are also cut at a bias to mate with the diagonal cut line of the end extrusions.

Such a construction provides a number of important advantages. First, it enables extrusions to be used as basic modular elements for producing solar collectors of different sizes. In addition, using metal for the extrusions provides a relatively high collector efficiency since the heated fluid, for example water, makes direct contact with the heated metal extrusions thereby providing direct-contact heat-exchange between the two. Further, such solar collectors can be produced very inexpensively since the need for conventional piping is obviated and the absorber panels can be manufactured in volume and at low cost.

According to a still further feature in the described preferred embodiment, the collector includes a transparent panel attached to the frame overlying and spaced from the radiation-absorbing surface of the absorber panel, and a partition in the space between the transparent panel and the absorber panel to reduce heat losses by convection. In the modular construction described, two or more such transparent panels may be used depending on the length of the collector.

Further features and advantages of the invention will be apparent from the description below.

BRIEF DESCRIPTION OF THE DRAWINGS

The invention is herein described, by way of example only, in the accompanying drawings, wherein:

FIGS. 2 and 3 are longitudinal and transverse sectional views along lines II—II and III—III, respectively, of FIG. 1;

FIG. 4 is an enlarged transverse sectional view of one of the metal extrusions used in making up the absorber panel in the device of FIG. 1; and FIGS. 5–9 are enlarged fragmentary sectional views along lines V—V, VI—VI, VII—VII, VIII—VIII, and IX—IX, respectively, of FIG. 1, illustrating further details of construction of the solar collector of FIG. 1.

DESCRIPTION OF THE PREFERRED EMBODIMENT

Figure 1:
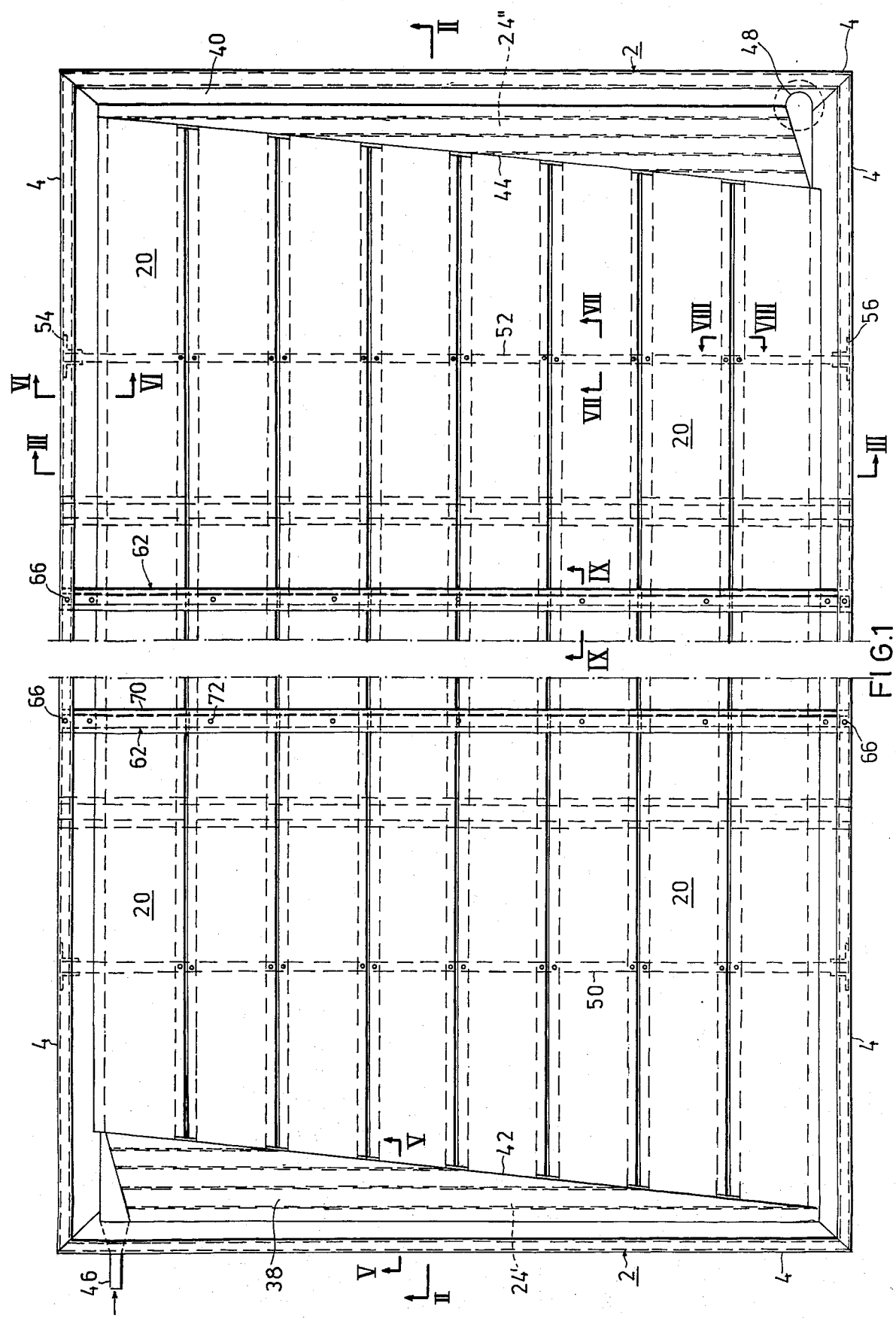
FIG. 1 is a top plan view of one form of solar collector constructed in accordance with the invention.

The solar collector illustrated in the drawings comprises a rectangular housing, generally designated 2, including a four-sided frame 4 preferably made of galvanized sheet metal and having top and bottom inturned rims 6, 8. The bottom wall of the housing is constituted of a panel 10 of heat insulation material, such as polyurethane or polystyrene, and the inner side of the rectangular frame 4 is lined with strips 12 of similar insulating material. Further, a bed of insulating material 14, which may be mineral wool or the like, is carried by the bottom panel 10 and is spaced from the side strips 12 by inclined spacer strips 15 of similar insulation material. The housing is closed at the top by three transparent glass panels 16 resting on the side liner strips 12 and sealed with respect to the frame rim 6 by additional insulation strips 18.

Disposed within housing 2 is an absorber panel, generally designated 20, having a blackened radiation-absorbing surface facing the window defined by the glass panels 16. Absorber panel 20 includes a main extrusion section made up of a plurality of individual metal (e.g. aluminum) extrusions 22 each formed with a plurality of fluid-conducting channels 24 extending in the direction of the length of the panel for conducting the fluid (such as water) to be heated by the solar radiations intercepted by the absorber panel.

Figure 6:
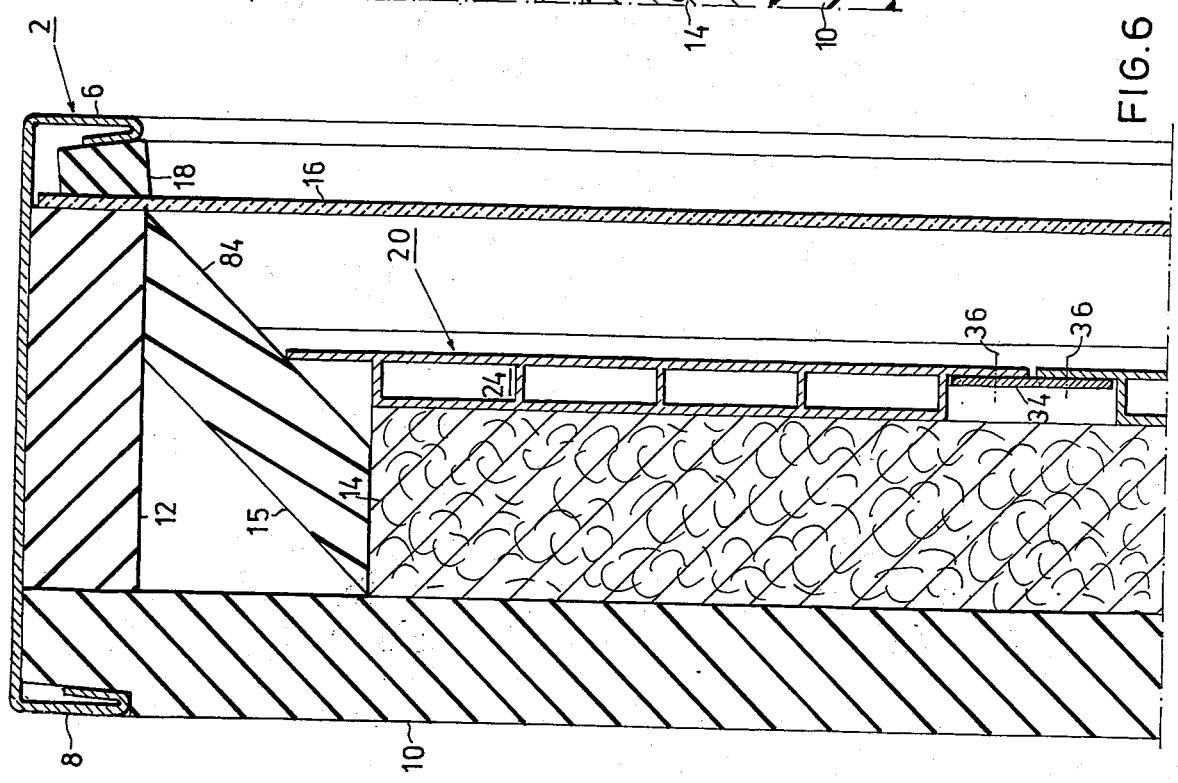

Each of the extrusions 22 making up the main section of the absorber panel 20 is better illustrated in FIG. 4. Each extrusion includes a pair of outer walls 26, 28 joined together by a plurality of transverse partitions 30 defining between them the fluid-conducting channels 24. Outer wall 26 is provided with extensions 32 on its opposite sides, which extensions serve as attaching flanges for attaching a plurality of the extrusions together in the direction of the width of the panel. As shown particularly in FIG. 6, the extrusions are attached together by the use of connecting metal strips 34 underlying the extensions 32 and attached thereto by fasteners 36.

In addition to the plurality of attached metal extrusions 22, the absorber panel 20 further includes an inlet header or manifold 38 (FIG. 1), and an outlet header or manifold 40. Each of these manifolds is also made of one of the metal extrusions 22, but in these cases, the extrusion is cut along a diagonal line 42, 44, respectively, through its fluid-conducting channels, 24', 24''. Inlet manifold extrusion 38 is joined (as by welding) along its diagonal cut line 42 to the inlet ends of the plurality of extrusions 22 making up the main extrusion section of the absorber panel 20, with channels 24' of extrusion 38 extending at right angles to and communicating with channels 24 of the extrusions 22. Similarly, outlet manifold extrusion 40 is joined along its diagonal cut line 44 to the outlet ends of the attached extrusions 22 with its channels 24'' extending at right angles to and communicating with channels 24 of the extrusions 22. The inlet and outlet ends of the extrusions 22 making up the main section of the absorber panel 20 are similarly cut at a bias to mate with the diagonal cut lines 42, 44 of the manifold extrusions 38, 40. An inlet pipe 46 (FIG. 1) is joined to the inlet manifold 38, and an outlet pipe 48 is joined to the outlet manifold 40.

It will be seen that the foregoing arrangement not only enables the same basic extrusion elements to be used in making the main section of the absorber panel 20 and the inlet and outlet manifolds 38, 40, but also provides an efficient distribution of the fluid heat-exchange media from the inlet pipe 46 to the channels 24 of the absorber panel 20, and from the latter to the outlet pipe 48.

Figure 8:
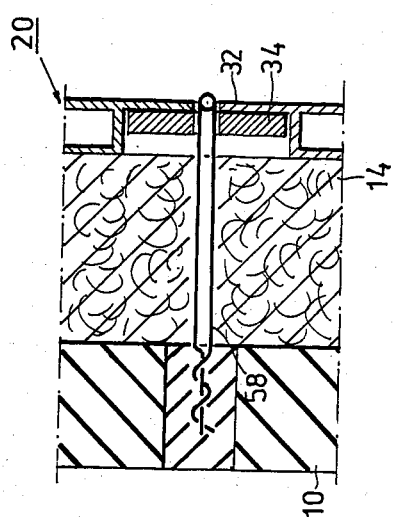

The absorber panel 20, including its inlet manifold 38, and outlet manifold 40, is supported within the collector housing 2 on a pair of spaced rigid insulating strips 50, 52 (shown particularly in FIGS. 1, 2 and 7) extending on edge transversely across the collector and fastened to its frame 4 by attachment lugs 54, 56 (FIG. 1). Strips 50, 52 may be of polyester-resin-impregnanted fibreglass, for example. The absorber panel 20 is placed on top of the upper edges of these strips and is secured to them by metal wires 58 (FIGS. 7 and 8) each wrapped around a plastic strip 50, 52 and one of the connecting strips 34 securing together the metal extrusions 22 making up the absorber panel 20, the ends of the wire being then twisted together as shown at 60 in FIG. 7. This may be conveniently done by removing circular plugs 10' (FIG. 7) from the bottom insulating panel 10 where each metal wire 58 is to be applied, and then re-inserting the plugs 10' after the metal wire has been attached and its ends 60 twisted.

The solar collector illustrated in the drawings comprises a plurality (three in this case) of transparent glass (or plastic) panels 16 defining the window of the collector. These glass panels are supported in side-by-side relationship along the length of the collector by a mounting, generally designated 62 in FIG. 1, attached to the frame and engaging the abutting ends of each pair of transparent panels.

Figure 9:
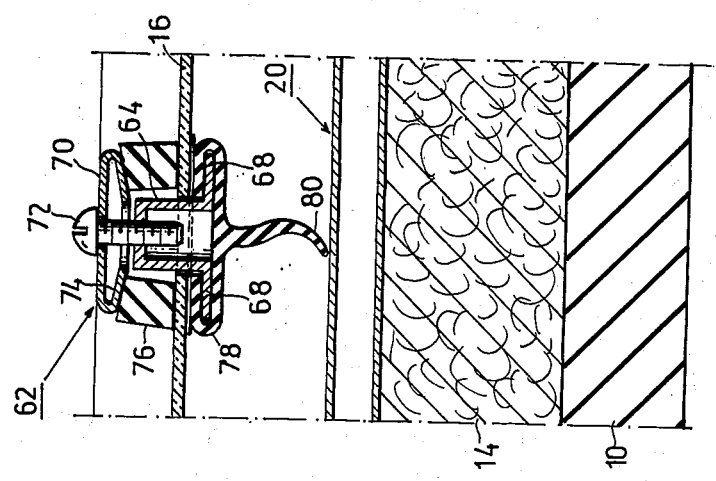

Mounting 62 for the abutting ends of each pair of transparent panels 16 is best illustrated in FIG. 9, wherein it will be seen that it includes a rigid metal strip 64 of U-shaped section extending transversely across the housing and attached to the frame by fasteners 66 (FIG. 1). Strip 64 is formed with out-turned flanges 68 which underlie the abutting edges of the transparent panels 16. Overlying these abutting edges is another metal strip 70 attached to strip 64 by a plurality of fasteners 72. Strip 70 is formed with a pair of in-turned spring ends 74 which press against insulating strips 76 interposed between them and the edges of the transparent panels 16 to provide a sealed and cushioned mounting of the panels.

In addition, mounting 62 for the transparent panels includes a partition extending towards and preferably engaging the absorber panel 20 to partition the space between the two panels and thereby to reduce losses by convection. This partition, also best illustrated in FIG. 9, is carried by a strip 78 of resilient material, such as rubber, interposed between the flanges 68 of mounting strip 64 and the edges of the transparent panels 16, strip 78 being formed with a depending tail or extension 80 which serves as the partition facing the upper surface of the absorber panel 20.

The upper surfaces 84 of the inclined insulating spacer strips 15 (FIG. 5) are preferably provided with a reflecting layer, of aluminum sheet for example, to reflect the solar radiations towards the absorber panel 20. The lower faces 86 of these spacer strips 15, as well as the lower face 88 of the bottom insulation panel 10, are preferably covered with a paper layer to prevent crumbling of the insulation because of solar radiation.

Finally, the solar collector includes a plurality of U-shaped metal sections 90 (FIG. 2) extending transversely across the housing and fastened to the opposite sides of the frame 4 for rigidizing the frame. These U-shaped sections may also be used as external attachments for attaching the solar collector to a support, such as the roof of a building.

While the invention has been described with respect to one preferred embodiment, it will be appreciated that many variations, modifications and other applications of the invention may be made.

What is claimed is:

1. A solar collector comprising a housing having a window transparent to solar radiations, and an absorber panel disposed within the housing and having a solar-radiation-absorbing surface facing said window; said absorber panel including a main extrusion section integrally formed with a plurality of fluid-conducting channels extending in one direction through the panel for conducting a fluid to be heated by the solar radiations intercepted by the absober panel, and two end extrusions each integrally formed with a plurality of fluid-conducting channels extending at right angles to those of the main extrusion section, and each cut along a diagonal line through its respective plurality of channels, one end extrusion being joined along its diagonal cut line to one end of said main extrusion section and constituting the inlet manifold of the absorber panel, the other end extrusion being joined along its diagonal cut line to the opposite end of said main extrusion section and constituting the outlet manifold of the absorber panel.

2. A solar collector according to claim 1, wherein said main extrusion section and said end extrusions are of metal and each includes outer walls joined together by a plurality of transverse partitions defining said fluid-conducting channels therebetween.

3. A solar collector according to claim 1, wherein the two ends of the main extrusion section are also cut at a bias to mate with the diagonal cut lines of the end extrusions.

4. A solar collector according to claim 1, wherein said fluid conducting channels of the main extrusion section extend in the direction of the length of the absorber panel, said main extrusion section including a plurality of individual extrusions attached together in the direction of the width of the panel.

5. A solar collector according to claim 1, wherein said housing includes a rigid frame, said window including a transparent panel attached to said frame overlying and spaced from the radiation-absorbing surface of the absorber panel, said collector further including a partition in the space between the transparent panel and the absorber panel to reduce losses by convection.

6. A solar collector according to claim 5, wherein said housing includes at least a pair of said transparent panels supported in side-by-side relationship by a mounting attached to said frame, said partition depending from said mounting and extending towards the absorber panel.

7. A solar collector according to claim 5, wherein said mounting comprises a rigid strip extending across said frame and attached thereto, and wherein said partition includes a resilient strip carried by and depending from said rigid strip towards the absorber panel.

8. A solar collector according to claim 5, wherein said housing includes a plurality of insulating strips extending on edge in spaced parallel relationship across said frame and attached thereto for supporting said absorber panel.

9. A solar collector according to claim 5, wherein said housing further includes an insulating panel supported by said frame and constituting the bottom wall of the housing, insulating liner strips around the frame, a bed of insulation between the absorber panel and the bottom insulating panel, and insulating spacer strips spacing the insulation bed from the insulating liner strips.

* * * * *